United States Patent
Eather et al.

(10) Patent No.: US 10,755,571 B1
(45) Date of Patent: Aug. 25, 2020

(54) IDENTIFYING PARKING LOCATION USING SINGLE CAMERA REVERSE PROJECTION

(71) Applicant: Amazon Technologies, Inc., Seattle, WA (US)

(72) Inventors: James Lance Eather, Kelvin Grove (AU); Lev Zelenskiy, South Brisbane (AU); Jon Robert Ducrou, West End (AU); Michael John Neville, Bunya (AU); Vaibhav Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/290,569

(22) Filed: Mar. 1, 2019

(51) Int. Cl.
| | |
|---|---|
| *G08G 1/14* | (2006.01) |
| *G06T 11/00* | (2006.01) |
| *G06K 9/00* | (2006.01) |
| *G08G 1/017* | (2006.01) |
| *G06K 9/32* | (2006.01) |

(52) U.S. Cl.
CPC ......... *G08G 1/146* (2013.01); *G06K 9/00785* (2013.01); *G06K 9/325* (2013.01); *G06T 11/006* (2013.01); *G08G 1/0175* (2013.01); *G08G 1/142* (2013.01)

(58) Field of Classification Search
None
See application file for complete search history.

(56) References Cited

U.S. PATENT DOCUMENTS

| | | | | |
|---|---|---|---|---|
| 6,400,405 B2* | 6/2002 | Tomida | ...................... | B60R 1/00 348/118 |
| 6,442,476 B1* | 8/2002 | Poropat | ...................... | G01S 5/16 701/23 |
| 7,039,521 B2* | 5/2006 | Hortner | .............. | G01C 21/3647 701/436 |
| 7,376,510 B1* | 5/2008 | Green | ................ | G01C 21/3632 340/915 |
| 8,063,752 B2* | 11/2011 | Oleg | ........................ | B60R 1/00 340/425.5 |

(Continued)

OTHER PUBLICATIONS

Li et al., "Vehicle 3-Dimension Measurement by Monocular Camera Based on License Plate", IEEE International Conference on Robotics and Biomimetics (ROBIO), Dec. 3-7, 2016, pp. 800-806.

(Continued)

*Primary Examiner* — Fekadeselassie Girma
(74) *Attorney, Agent, or Firm* — Kilpatrick Townsend & Stockton LLP

(57) ABSTRACT

A system and method are disclosed, in which two or more points of a target object from a two-dimensional (2D) image may be "reverse projected" from a 2D plane to a 3D space. The method may comprise receiving a 2D image from a 2D camera, the 2D image including a representation of a physical topography and a target object of a plurality of target objects, the plurality of target objects being associated with a common physical characteristic, the common physical characteristic of the target object being detectable within the 2D image. The method may further comprise determining a position relative to the physical topography of the target object based upon a position of the target object in the image and the common physical characteristic of the target object.

12 Claims, 9 Drawing Sheets

(56) References Cited

U.S. PATENT DOCUMENTS

| | | | | |
|---|---|---|---|---|
| 8,134,479 | B2* | 3/2012 | Suhr | G06K 9/00812 |
| | | | | 340/436 |
| 8,352,180 | B2* | 1/2013 | Geelen | G01C 21/3647 |
| | | | | 701/431 |
| 8,352,181 | B2* | 1/2013 | Hagiwara | G01C 21/36 |
| | | | | 701/420 |
| 8,423,292 | B2* | 4/2013 | Geelen | G01C 21/26 |
| | | | | 340/995.2 |
| 8,483,951 | B2* | 7/2013 | Shih | G06K 9/00791 |
| | | | | 701/28 |
| 8,532,924 | B2* | 9/2013 | Poiesz | G01C 21/3635 |
| | | | | 340/995.11 |
| 8,626,427 | B2* | 1/2014 | Park | G06K 9/00798 |
| | | | | 701/119 |
| 8,862,380 | B2* | 10/2014 | Jung | B60W 30/095 |
| | | | | 701/301 |
| 8,874,364 | B2* | 10/2014 | Lathrop | G08G 1/0962 |
| | | | | 340/903 |
| 8,880,341 | B2* | 11/2014 | Han | G01C 21/3638 |
| | | | | 340/995.11 |
| 9,595,109 | B1* | 3/2017 | Umakhanov | G06T 7/0042 |
| 9,791,288 | B2* | 10/2017 | Mueller | G01C 21/3647 |
| 10,311,731 | B1* | 6/2019 | Li | G08G 1/142 |
| 10,345,437 | B1* | 7/2019 | Russell | B60W 30/0956 |
| 2004/0236506 | A1* | 11/2004 | Kolb | G01C 21/3647 |
| | | | | 701/436 |
| 2006/0007308 | A1 | 1/2006 | Ide et al. | |
| 2014/0270381 | A1* | 9/2014 | Wu | G08G 1/146 |
| | | | | 382/104 |
| 2015/0161891 | A1* | 6/2015 | Dance | G06Q 10/063 |
| | | | | 705/7.11 |
| 2015/0287058 | A1* | 10/2015 | Dance | G06Q 30/0202 |
| | | | | 705/7.35 |
| 2016/0360081 | A1* | 12/2016 | Tsubaki | H04N 5/23264 |
| 2017/0032563 | A1* | 2/2017 | Distler | G06T 15/04 |
| 2018/0024641 | A1* | 1/2018 | Mao | G06T 7/251 |
| | | | | 382/103 |
| 2018/0098073 | A1* | 4/2018 | Lawrence | H04N 19/182 |
| 2018/0293445 | A1* | 10/2018 | Gao | B60W 30/09 |
| 2018/0297210 | A1* | 10/2018 | Peterson | B25J 13/006 |
| 2019/0035277 | A1* | 1/2019 | Son | G08G 1/0965 |
| 2019/0122460 | A1* | 4/2019 | Reyes | G07C 5/0808 |
| 2019/0164428 | A1* | 5/2019 | Pu | G01C 21/00 |
| 2019/0236853 | A1* | 8/2019 | Vander Helm | G06Q 10/02 |
| 2019/0272682 | A1* | 9/2019 | Qian | G08G 1/148 |
| 2019/0394441 | A1* | 12/2019 | Simek | H04N 13/239 |

OTHER PUBLICATIONS

Application No. PCT/US2020/020166, International Search Report and Written Opinion, dated Jun. 18, 2020, 12 pages.

* cited by examiner

IDENTIFYING PARKING LOCATION USING SINGLE CAMERA REVERSE PROJECTION

BACKGROUND

Systems and methods exist for constructing representations of the real world in three-dimensional (3D) coordinate space. For example, some devices and techniques that have been introduced to enable depth perception in a 3D space include 3D cameras, stereoscopic cameras, time-of-flight cameras, light-field cameras, photogrammetry, coded aperture, etc. Applications of these devices and techniques include constructing 3D scans (e.g., scanning a person's face to mimic their facial expressions), measuring the distance from the camera to an object, determining the volume of an object by scanning the object, etc. Another important application includes tracking the movement of objects to and from locations in a real-world 3D space. For example, cameras are used for monitoring the movement of vehicles entering and exiting a parking lot. In one example, customers may park in a parking lot space while their grocery order is being filled, and the 3D camera may be trained to detect when a car has parked in a specific parking lot space. 3D cameras may also be used to track the movements of people to and from a given location (e.g., entering a building).

With rising customer demand for applications such as "grab-and-go" grocery experiences, service providers often need to make large capital expenditures and incur significant operating expenses overhead to maintain a set of monitoring cameras for a given location (e.g., a parking lot with several spaces). These capital expenditures may include purchasing a large number of cameras (e.g., one monitoring camera per parking space), and/or purchasing sophisticated 3D cameras (similar to the devices and techniques described above), whereby each 3D camera may cover a wider range and/or depth in a 3D space than a cheaper off-the-shelf camera may cover. Also, cameras with more sophisticated hardware may require more resources (e.g., human technical resources) to set up and be more expensive to maintain when the camera may require servicing. Therefore, there is a need to improve the process of using a camera to identify objects with known physical characteristics at a specific location within a real-world physical topography.

BRIEF DESCRIPTION OF THE DRAWINGS

Various embodiments in accordance with the present disclosure will be described with reference to the drawings, in which.

DETAILED DESCRIPTION

Figure 1:
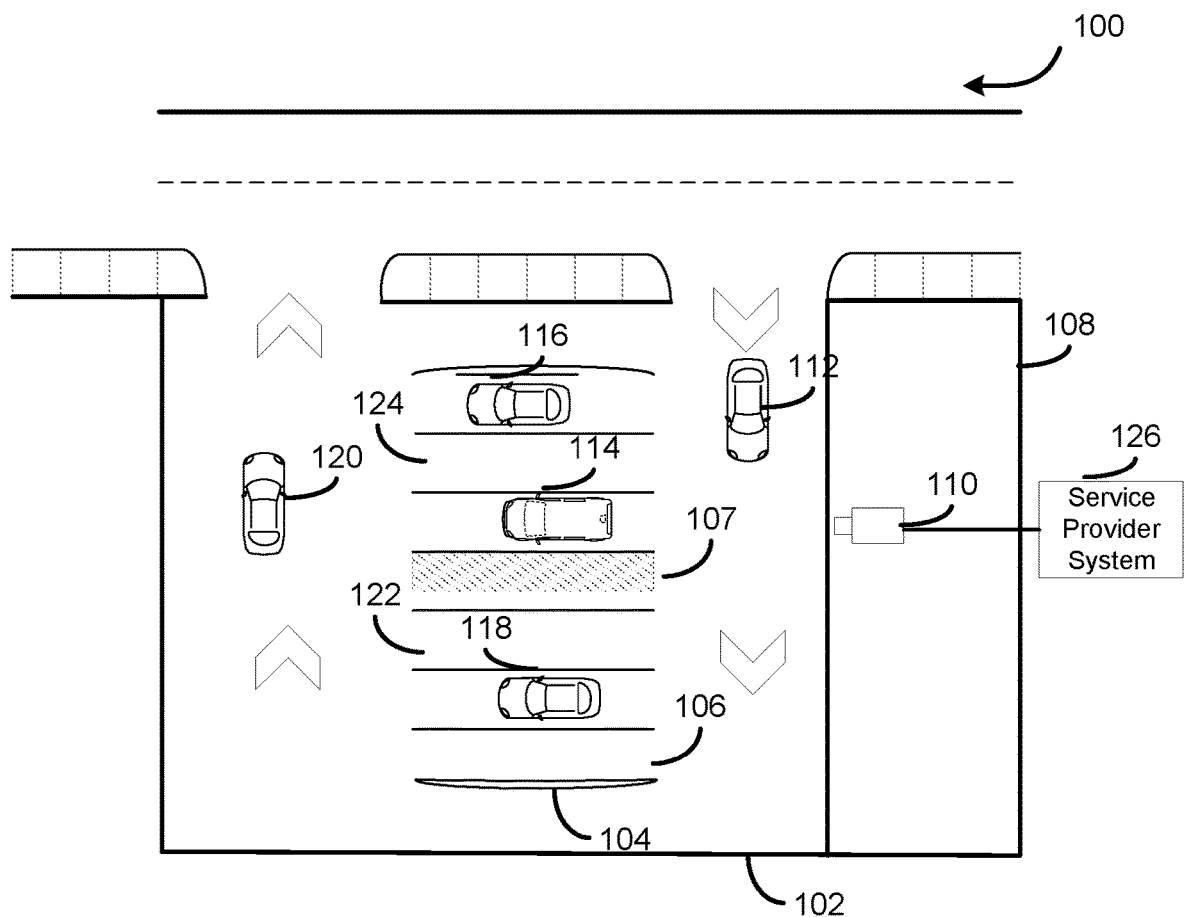
FIG. 1 illustrates a top-down view an example location site under camera surveillance, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a "reverse projection" service using a system having a single camera. By "reverse projection," we mean utilizing known physical characteristics of an object to map the object, represented in a two-dimensional (2D) plane, to a discrete location in a three-dimensional (3D) coordinate space. The service may include a pre-execution process for configuring the system. The system utilizes the specific camera's parameters, a mapping between the physical topography within the camera's angle of view and a 3D coordinate system, a mapping of one or more cuboids formed by the 3D coordinate system to one or more discrete locations, and information about known physical characteristics of a physical object. When the system has this information, the service may be executed by receiving an image from the camera, performing a target recognition on the image, performing reverse projection by mapping at least two points of the target in a 2D plane to points in a 3D coordinate system, and then mapping the 3D points corresponding to the target to one of the discrete locations.

By way of illustrative example, consider a scenario where a consumer places an order for various items available from a pick-up location. In this scenario, the consumer may typically drive to and park a vehicle in a parking space within a parking lot in front of the pick-up location. The parking lot may contain a number of parking spaces. A single standard camera may be mounted such that its angle of view comprises a plurality of parking spaces of the parking lot. The camera may be configured to capture images of the plurality of parking spaces upon the occurrence of some event (e.g., detecting motion, predetermined time interval, etc.). For example, in some embodiments, the camera may capture an image of the vehicle arriving at the parking lot or leaving the parking lot. In other embodiments, the camera may capture the consumer's vehicle parked in a parking space. The camera may transmit images to a computer system for further processing of the image. In some embodiments, the camera may be coupled to a computer system as part of a single device unit.

In accordance with at least one embodiment, the computer system may receive the image from the camera and perform an analysis of the image. Prior to performing the analysis, the computer system may be configured to receive parameters that correspond to characteristics of the camera, including intrinsic parameters, extrinsic parameters, and distortion coefficients. These parameters may be used to enable the system to calibrate the camera, for example, to correct for lens distortion, to maintain a mapping between a real-world physical topography within the camera's angle of view (e.g., the parking lot and cars in the lot) and 3D space, and to reverse project points of a 2D target object of the image to a 3D coordinate system. The 3D coordinate system may form a plurality of cuboids, wherein each cuboid is determined by eight connected points of the 3D coordinate space. One or more cuboids of the plurality of cuboids may be further grouped into discrete locations (e.g., parking spaces in a parking lot). In this way, each parking space of a pick-up location parking lot may be mapped to one or more cuboids of the 3D coordinate space.

In accordance with at least one embodiment, the system may also be trained to recognize (i.e., infer) target objects within an image, wherein the target objects may correspond to physical objects within an image. Continuing with an example above, the system may be trained to recognize a target object corresponding to the license plate of a car that is parked in a parking space of the pick-up location parking lot. The system may also have received as input certain physical characteristics (e.g., height, width, color, orientation in a 3D space, etc.) that characterize the target object's type (e.g., a standardized vehicle license plate).

In accordance with at least one embodiment, and continuing with the example above, the computer system may reverse project a license plate detected within the 2D image to a 3D coordinate system, based at least in part on the camera parameters and the known physical characteristics of a vehicle license plate type previously received as input by the system. As an example of known physical characteristics of the vehicle license plate type, the system may know that a vehicle license plate has a height of 15 centimeters, and therefore, for any given upper corner (A) and lower corner (B) of a license plate, the Y-coordinate of A is 15 centimeters (cm) greater than the Y coordinate of B (i.e. $Y_A \approx Y_B + 0.15$ m). The system may also know that corners of a same side of a license plate affixed to a car are positioned, respectively, at approximately the same depth measurement (i.e. $A_Z \approx B_Z$, $C_Z \approx D_Z$). Given that at least A and B are geometrically similar, the system may also infer that, when mapping points A and B from a 2D plane (i.e. an image captured by the camera) onto a 3D coordinate space, a scaling factor used to project a point corresponding to a license plate corner in the 2D image to a point in 3D coordinate space may be the same for corners A and B. In another embodiment, the system may also know that a characteristic of vehicle license plates is that the width of a license plate is approximately double the height (e.g., 30 cm:15 cm=2:1 ratio).

In accordance with at least one embodiment, the computer system may perform reverse projection, in part, by computing a scaling factor, utilizing at least the camera parameters, the coordinates of at least two points of a target object in the 2D plane of the image, and known physical characteristics of the license plate. The scaling factor may be specific to a particular point, and may be computed by solving a set of equations, wherein the equations include an error function, the error function generated in part based on the known physical characteristics of the license plate. The system may compute the value of scaling factor which minimizes the error function, and then use that value to solve the set of equations. The equations may include a matrix algebraic expression of a mapping between a 2D coordinate in a pixel plane and a 3D coordinate, as described in detail below. In another embodiment, the system may utilize a known characteristic that the ratio between width and height of a license plate is 2:1 by converting the projected rectangular corners of a license plate in the 2D image to projected square corners in a 2D image. Then, the projected 2D square corners may be processed by a known algorithm that computes the reverse projected 3D coordinates of the license plate.

In accordance with at least one embodiment, once the computer system has reverse projected the license plate target object from the 2D plane to a 3D coordinate system, the system may then determine which of the one or more cuboids of the 3D coordinate system the license plate is included within. Based on that information, and the previously determined mapping between one or more cuboids and the one or more discrete locations (i.e. discrete parking spaces), the system may determine which parking space is associated with the license plate (and therefore, the car associated with parking space).

It should be understood that the method for reverse projection described above, mapping a target object from a 2D pixel plane to a 3D coordinate space, may be applicable to other physical objects with known characteristics that may be captured by a simple camera in a 2D image. The physical object should have at least two known points, wherein the 2D coordinates of each point is known. Each point's coordinates in the 2D plane may correspond to a first x-axis measuring width on the horizontal plane and a first y-axis measuring height on the vertical plane). The method allows for mapping the target object from the 2D space in a pixel plane to a 3D space based at least in part on the target object's known physical characteristics, wherein the known physical characteristics each corresponds to an aspect of mapping the two or more points onto a 3D coordinate space (e.g., the relative position of one point to another point along one or more axes). Each point's coordinates in 3D space may correspond to a second x-axis measuring width on the horizontal plane, a second y-axis measuring height on the vertical plane, and a first z-axis measuring depth of the target object. The first x-axis may correspond to the second x-axis, and the first y-axis may correspond to the second y-axis, although the respective values may differ, in part based on the parameters of the camera.

In some embodiments, the method described above may be used to determine the location of an object in a 3D coordinate space, either for including the object or excluding the object from further processing by the system. For example, as described in the example above, the camera may capture the license plate of a car that is arriving at the parking lot or leaving the parking lot (in addition to cars that are parking in a parking space). The system may be intended to only process cars that are currently parked in a parking space of the parking lot. Accordingly, the system may use the above described method to detect a car (e.g., via a license plate detection) that is not parked in a parking spot (i.e. the one or more cuboids in 3D space to which the license plate is mapped that does not correspond to a parking space), and filter out that car from being process further (e.g. fulfilling an order for that car from the pick-up location).

The embodiments of the present disclosure may provide several technical improvements over existing systems. Generally, as described above, existing systems may require large capital expenditures and significant recurring expenses for purchasing and maintaining devices to detect objects within a specific location in a 3D space. One approach is to purchase many cameras, wherein one camera is assigned one specific location among a plurality of locations (e.g., one camera's angle of view being configured to cover a specific single parking space in a parking lot), whereby a camera's job is simply to detect whether an object is in the location or not. This type of detection may be performed without relying on depth perception in a 3D coordinate space, as a straight-on camera angle view may be used. Another approach may rely on sophisticated devices to capture a 3D image with a wider angle of view to cover multiple locations. For example, a single 3D camera may be used to capture an entire parking lot. Because a 3D camera is used, multiple cars in different parking spaces may be detected. Images captured by the 3D camera may include license plates of varying sizes. For example, a car parked at the opposite end of the lot from where the camera is mounted may have a license plate that appears smaller in the image than the license plate of a car that is closer to the camera. Also, the depth of the license plates in the 3D image may still be detected even though they may not be captured with a straight-on camera view. However, while this type of system may have the advantage of using less cameras, each individual camera may be very expensive and cost significant resources (both financial and human) to maintain.

In contrast, the embodiments of the present disclosure provide several technical advantages, including a method for achieving similar goals to the above-described existing systems while significantly reducing financial and human resource costs for service providers. The embodiments described herein allow for a single, simple camera to capture a 2D image of a 3D real-world physical topology and to "reverse project" objects with known physical characteristics in the 2D image to a 3D coordinate space. This allows for a single, simple camera to do the same job that existing systems may require many cameras for, and/or may require more sophisticated hardware. Additionally, the camera may be easier to configure, maintain, and/or replace, as a typical off-the-shelf camera would be sufficient to perform the method. The embodiments may also not only be used as an alternative to existing systems, but may be used to improve the accuracy of detection in existing systems. For example, an existing 3D camera monitoring a parking lot may occasionally incorrectly detect a car in a certain parking space. The present disclosure may provide a mechanism to double check the reliability of the 3D camera's output.

FIG. 1 illustrates a top-down view an example location site 100 under camera surveillance, according to an embodiment of the present disclosure. In FIG. 1, a parking area 102 for a pick-up location 108 is depicted. The parking area 102 includes a parking lot 104, and the parking lot 104 includes a plurality of parking spaces 106, wherein each parking space 106 may contain a parked vehicle 114, 116, 118, or may be empty 106, 122, 124. In some embodiments, each parking space 106 in the parking lot may be associated with a discrete location identifier (e.g., a physical sign labeling each parking space, and/or a data label that may be maintained by the service provider system 126). For example, parking space 106 may be called "Parking Space A," and the space immediately adjacent to parking space 106 may be called "Parking Space B," etc. For this parking lot 104, with six parking spaces, the spaces may be labeled A-F. Any suitable labeling nomenclature may be used. Continuing with the example in FIG. 1, location site 100 depicts vehicle 118 being parked in Parking Space B. The parking lot 104 may be configured such that there are gaps in between the parking spaces. For example, a parking lot may provide a walkway between one or more spaces to allow people and/or merchandise to be more easily transported to and from cars. Another example may be a parking lot that is covered by a roof, the roof being supported by a supporting pillar structure 107 that subdivides the parking spaces.

In some embodiments, there may be a single camera 110 that is mounted such that the camera's angle of view captures one or more of the spaces of the parking lot 104. In other embodiments, there may be more than one camera that is mounted to capture different vantage points. For example, in an embodiment where there are multiple rows of parking spaces in a parking lot, there may be one camera assigned to monitor the parking spaces in that particular row. It should be noted that a camera may be configured such that it not only captures a parking space from a straight-on vantage point (e.g., parked vehicle 114, relative to camera 110), but also parking spaces that are still within the camera's angle of view (e.g., parking space 106). In this example, camera 110 may be configured such that cars parked in spaces A-F are within the camera's angle of view.

Any suitable photographic camera may be used to implement the methods described in the present disclosure, including, but not limited to, compact digital cameras, digital SLR cameras, mirrorless cameras, action cameras, 360 cameras, film cameras, etc. In some embodiments, the camera 110 may be an RGB (red-green-blue) camera. In other embodiments, the camera 110 may be a monochromatic camera. The camera 110 should be configured to capture an image of a physical topography in at least a two-dimensional space (discussed in further detail below). It should be noted that the camera 110 may also be a type of video camera (herein, unless limited by an adjective or otherwise, the term "camera" may denote any type of photographic camera, including both still cameras and movie (i.e. video) cameras) that is enabled to record a sequence of images, wherein each image may correspond to a frame. For example, suitable video cameras may include camcorders, surveillance cameras, security cameras, webcams, smartphone cameras, closed-circuit television (CCTV) cameras, etc. The camera 110 may be connected to a service provider computer system 126 that is communicably coupled to the camera, wherein the computer system receives images captured by the camera and does further processing on the images received, as discussed in more detail below. The service provider computer system 126 may be on-premises (e.g., physically bundled with the camera 110) or off-premises (e.g., a server computer system in a separate building).

Continuing with the example of FIG. 1, the pick-up location 108 may be designed to receive orders from customers online. In this scenario, a customer may drive to the pick-up location 108 and enter the parking area 102, as illustrated by vehicle 112. The vehicle 112 may search for an available parking space (e.g., parking space 106) in the parking lot 104 and then proceed to park the car. Although vehicle 112 may still be in the process of searching for a space and not yet parked, the camera 110 may still be configured to capture the vehicle 112 within its angle of view. Similarly, a vehicle 120 exiting the parking lot 104 may also be captured by an image taken by the camera 110. However, a computer system that processes images captured by the camera 110 may be configured to filter out vehicles 112, 120 (i.e. non-parked vehicles) from further processing.

The vehicle 112 entering the parking area 102 may locate an available parking space 106, 122, 124 in the parking lot 104 and proceed to park. The camera 110 may capture an image of the parked vehicle 112 in one of the parking spaces. As described above, other vehicles may also be captured in the same image. For example, parked vehicles 118, 114, and 116 may also be captured within the image. As discussed above, the captured one or more images may be transmitted to the computer system 126 for further processing. The computer system 126 may be configured to at least: maintain a first mapping between a physical topography (e.g., a parking lot 104) and a three-dimensional coordinate space, the physical topography being within a camera's (e.g., camera 110) angle of view; maintain one or more physical characteristics of a predetermined physical object type (e.g., license plate of a vehicle), wherein an object of the predetermined physical object type corresponds to at least two points (e.g., two of the corners of a license plate), the at least two points each being mappable onto the three-dimensional coordinate space, and wherein the one or more physical characteristics each corresponds to an aspect of a mapping of a point of the at least two points onto the three-dimensional coordinate space; receive an image from the camera, the image corresponding to a representation of the physical topography; determine, based at least in part on a target recognition model, at least one target object from the image (e.g., a license plate of one of the vehicles in the parking area 102), wherein a target object type of the at least one target object matches the predetermined physical object type; generate a second mapping, based at least in part on the determination that the target object type of the at least one target object matches the predetermined physical object type and the maintained one or more physical characteristics of the predetermined physical object type, between the target object and the three-dimensional coordinate space. Once the computer system 126 has mapped the license plate of one of the vehicles to a 3D coordinate space, it may then further map the license plate to a discrete location identifier that corresponds to a discrete location (e.g., "Parking Space A" identifier corresponding to Parking Space A).

The computer system 126 may then transmit to a staff person of the pick-up location 108 that a car has arrived in Parking Space A. In some embodiments, the computer system 126 may do further processing of the license plate. For example, the system 126 may do image recognition of the characters on the license plate to determine the identity of the vehicle. With that information, the system 126 may be able to match a particular parking space with a vehicle, and then further match the vehicle to a customer's order. A staff member may be able to quickly deliver the customer's order to the correct parking space where the customer's vehicle is parked. In this way, a staff member of the pick-up location may significantly reduce the amount of time it takes to fulfill an order. After the order is fulfilled, the vehicle may leave the parking space and exit the parking area 102.

It should be understood that although the example scenario discussed above and in more detail in subsequent figures may pertain to license plate recognition in a parking lot environment, the use of this type of scenario should not be construed to pose a limitation on the scope of the disclosure.

Figure 2:
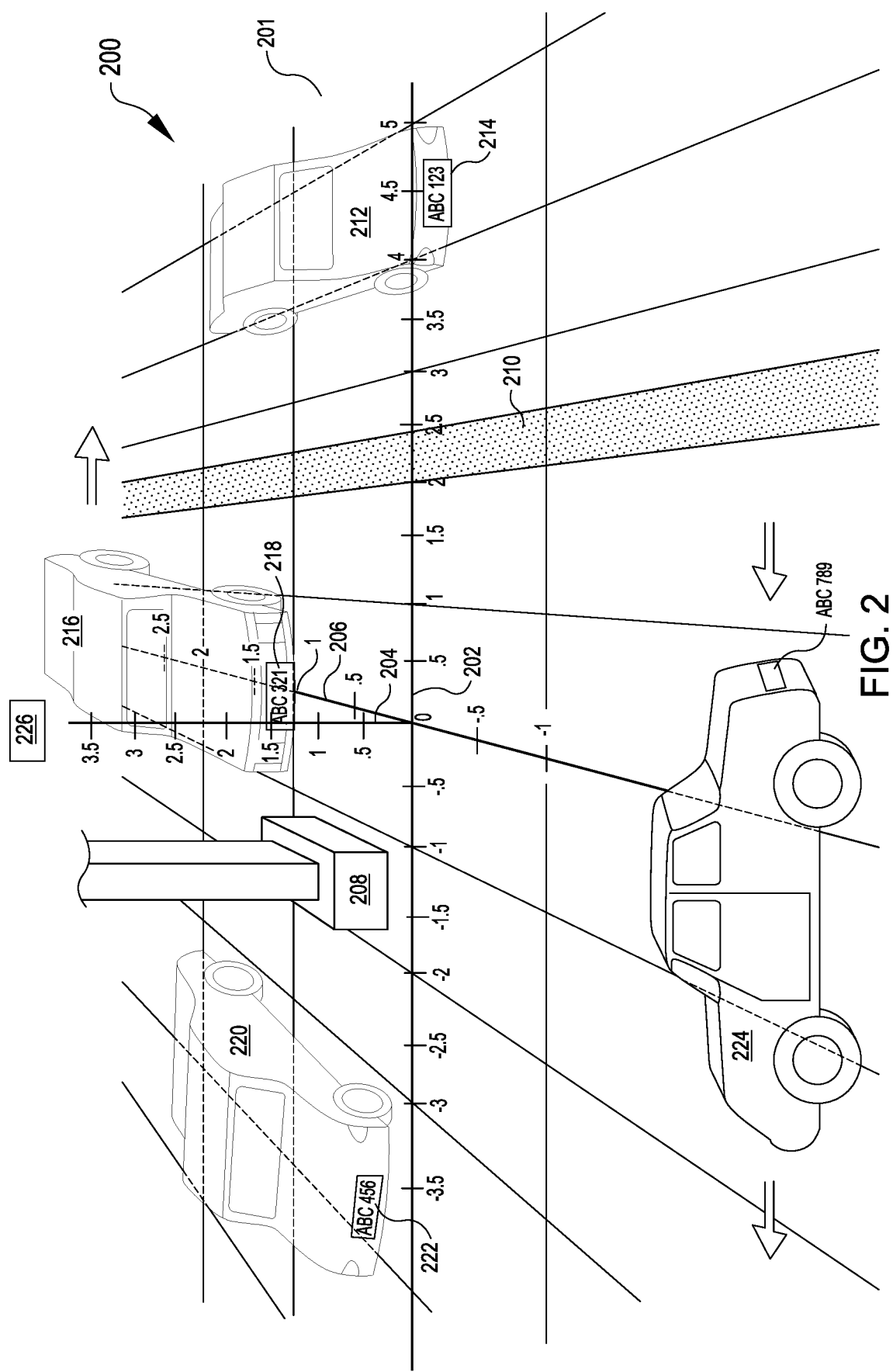
FIG. 2 illustrates a side angle view of the example location site of FIG. 1 captured by a camera, according to an embodiment of the present disclosure.

FIG. 2 illustrates a side angle view of an example location site 200 under camera surveillance, according to an embodiment of the present disclosure. A camera 226 may be mounted that captures an image of a parking lot 201, wherein the camera's angle of view is captured in FIG. 2 from the camera's vantage point. The camera may correspond to the camera 110 of FIG. 1, and the parking lot 201 may correspond to at least a portion of the parking lot 104 of FIG. 1. In some embodiments, a computer system (which may correspond to service provider system 126 of FIG. 1) may receive an image that corresponds to the camera's angle of view represented by FIG. 2. The computer system may, based in part on the image and known parameters of the camera (discussed in more detail below), maintain a mapping between the vehicle parking lot 201 and a 3D coordinate space. The three-dimensional (3D) space may be represented by an x-axis 202 corresponding to width, a y-axis 204 corresponding to height, and a z-axis 206 corresponding to depth. In some embodiments, the distance between coordinates along any given axis may be the same as the distance between coordinates along the other axes, in which case the 3D grid may form a plurality of cubes. In other embodiments, the distance between coordinates along any given axis may be different than the distance between coordinates along the other axes, in which case the 3D grid may form a plurality of cuboids. (Herein, the term "cuboid" may also be used to describe a geometric cube.)

Figure 3:
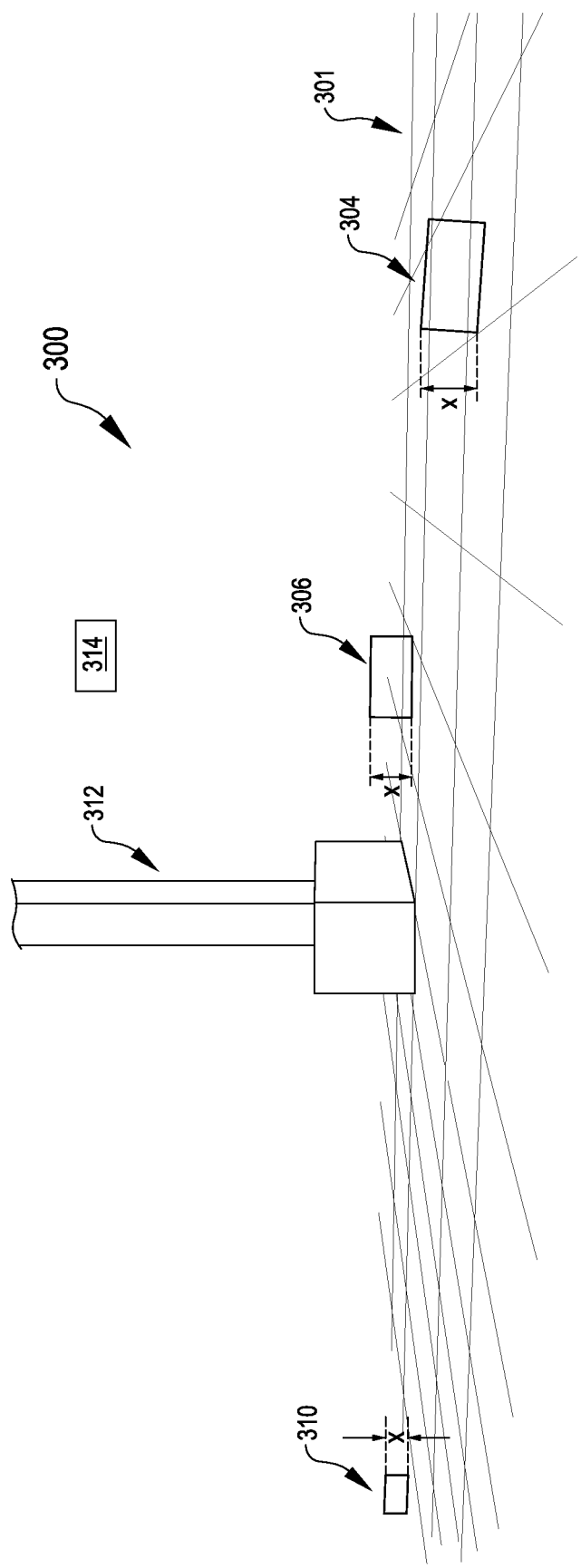
FIG. 3 illustrates a side angle view of a physical object captured by a camera at the example location site of FIGS. 1 and 2, according to an embodiment of the present disclosure.

In FIG. 2, three vehicles 212, 216, 220 are each shown parked in parking spaces in the parking lot 201. Although each vehicle may be parked in a parking space that is immediately adjacent to another parking space, each vehicle may be parked at a different depth from the vantage point of the camera 226. Also, the vehicles may each be parked at different angles with respect to the camera's angle of view. These factors may cause an image, which may contain a license plate 214, 218, 222 affixed to each of the parked cars, to display each license plate with varying shape and size (as depicted in FIG. 3, below). Similar to FIG. 1, there may be permanent object and/or gaps between one or more of the parking spaces. For example, in FIG. 2, a pillar 208 (which may correspond to pillar 107 of FIG. 1) may subdivide the parking spaces currently occupied by vehicle 220 and vehicle 216. Another example may be a walkway 210 that divides vehicle 216 and vehicle 212. These types of objects or gaps may contribute to causing vehicles captured within an image to be pushed out to a wider angle from the camera. Accordingly, this may further cause the size and/or shapes of license plates captured to vary, depending on each plate's angle and range from the camera 226.

In some embodiments, cuboids formed by the 3D coordinate space of the three axes 202, 204, 206 may be further mapped to discrete locations, in which each discrete location may include one or more cuboids. As discussed above, an example of a discrete location may be a parking space. Each parking space may be labeled with a discrete location identifier (e.g., "Parking Space F", etc.). In FIG. 2, vehicle 212 may be parked in Parking Space F. In some embodiments, discrete location identifiers may correspond with human-friendly names (e.g., parking spaces instead of cuboids and/or coordinates), which may make it easier for staff of an order pick-up location to identify a parking space where a vehicle is parked. Accordingly, once a computer system has mapped the license plate of one of the vehicles to the three-dimensional coordinate space, it may then further map the license plate to a discrete location identifier that corresponds to a discrete location (e.g., "Parking Space F" identifier corresponding to Parking Space F). Also, the 3D coordinate system may be used to determine the location of vehicles that may not be parked in a parking space. For example, vehicle 224 may be entering the parking area to park in the parking lot 201. The camera 226 may capture an image including vehicle 224, but the system may determine (via the method described further below) that the vehicle's location corresponds to one or more cuboids of the 3D coordinate system that are not mapped to parking spaces. Accordingly, the system may filter out vehicle 224 from being processed further. For example, the system may not transmit a message to a pick-up location that a customer order is waiting to be filled.

FIG. 3 illustrates a side angle view of an example location site 300 under camera surveillance, according to an embodiment of the present disclosure. In FIG. 3, a similar camera angle of view is depicted as in FIG. 2. However, FIG. 3 further illustrates the different sizes and shapes of a given object (e.g., vehicle license plate) that may be captured in an image by a camera 314 (which may correspond to camera 226 of FIG. 2) with a fixed angle of view of a parking lot 301 (which may correspond to parking lot 201 of FIG. 2 and parking lot 104 of FIG. 1). Also, the pillar 312 may correspond to the pillar 208 of FIG. 2 and the pillar 107 of FIG. 1. As described above, certain fixtures and/or characteristics of the parking lot 301 (e.g., pillar support structures, walkways, etc.) may cause vehicles to be parked at a wider space from each other than would otherwise be. Accordingly, a camera 314 that captures multiple parking spaces of the parking lot 301 may be configured to cover a wider angle of view.

In FIG. 3, three rectangular-shaped polygons 304, 306, and 310 are depicted, each polygon corresponding to a vehicle license plate in parking lot 301 that is captured by camera 314. License plate 304 may correspond to license plate 214 of FIG. 2, license plate 306 may correspond to license plate 218, and license plate 310 may correspond to license plate 222. As shown, license plate 304 corresponds with a larger-shaped polygon (relative to the other two), because the vehicle may be parked closer to the camera. The vehicle may also be parked in a way such that it is not directly straight-on from the camera's angle of view, and/or the license plate may not be affixed to the car in proper alignment, so the corners of the plate 304 may not appear at 90 degree angles, relative to each other. However, as discussed below, the system of FIG. 4 may be configured to take into account minor degrees of error, and still perform target object recognition and subsequently perform reverse projection of the target object from a 2D plane to a 3D coordinate space. In contrast, license plate 306 may correspond with a smaller-shaped polygon because it is parked farther from the camera. Additionally, license plate 310 may correspond with an even smaller-shaped polygon than the other two because it is parked farther from the camera and at a wider angle from the camera's angle of view. It should be understood that, and as discussed below regarding the system of FIG. 4, regardless of the dimensions of the license plate that may appear in the image, once the system determines that the target object is a type of vehicle license plate, it may rely on known physical characteristics of the license plate type to perform further calculations enabling reverse projection. For example, in FIG. 3, the distance between an upper corner and a lower corner for any given side of the license plates is assumed to be the same distance x (e.g., 15 centimeters).

Figure 4:
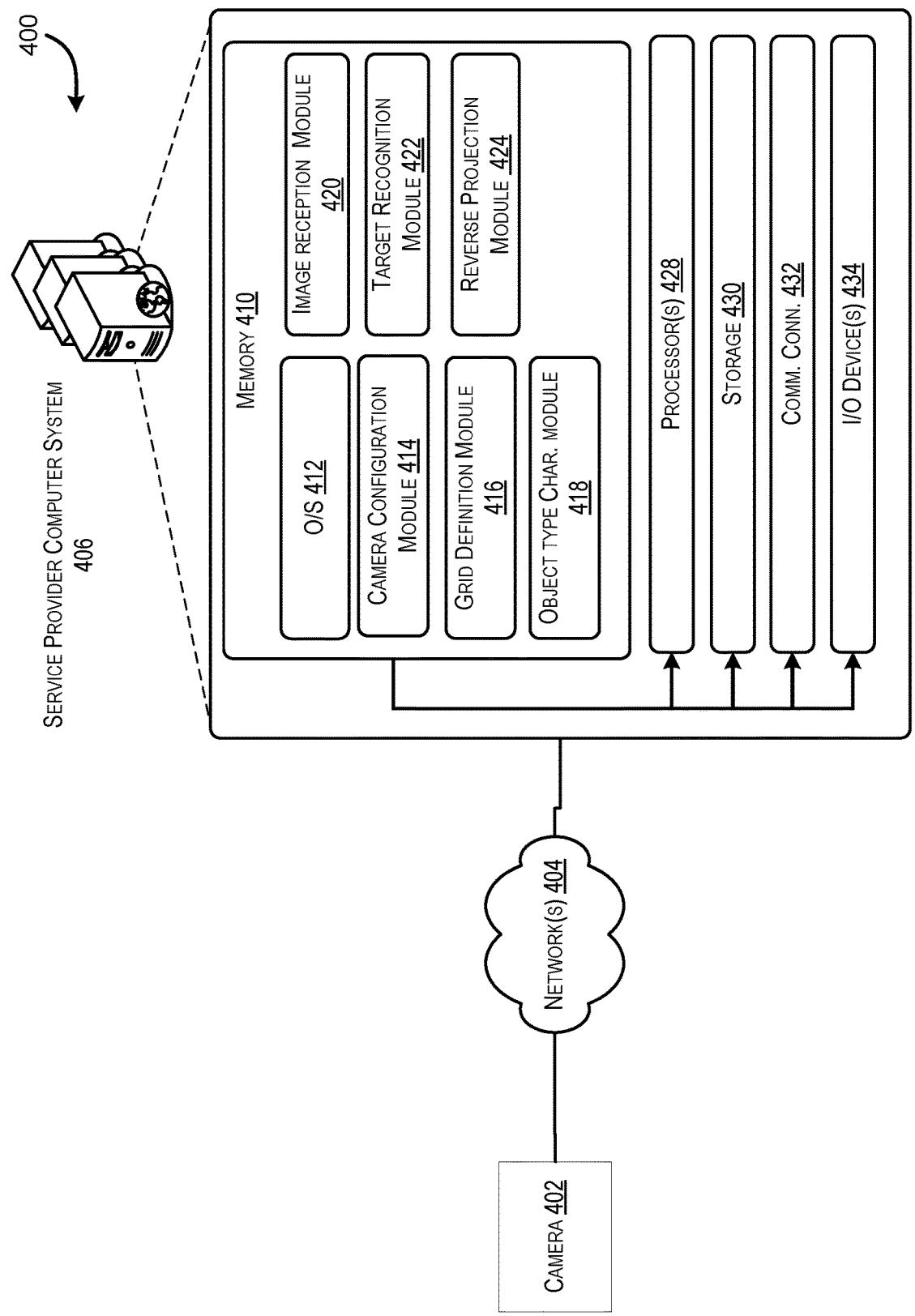
FIG. 4 is a block diagram of an example architecture for a system utilizing a camera to detect a physical object in a specific location, according to an embodiment of the present disclosure.

FIG. 4 is a block diagram of an example architecture 400 for a service provider system 406 utilizing a camera 402 to detect an object in a specific location, according to an embodiment of the present disclosure. The system may include a camera 402, which may correspond to the camera 110 of FIG. 1, camera 226 of FIG. 2, and/or the camera 314 of FIG. 3. The camera 402 should be configurable to capture images of a quality such that target object recognition may be performed on the image. In some embodiments, an off-the-shelf camera (e.g., capable of capturing 2D images) may be used. In some embodiments, the camera should be capable of capturing images within a certain pixel resolution range that is sufficient to perform target object recognition on the image. This may vary depending on the type of target object the system has been trained to recognize. For example, for a system intended to recognize the characters on license plates, a 1080P resolution may be sufficient. However, for determining only the existence of a license plate in a particular location, a lower resolution (e.g., 720P) may be sufficient. It should be understood that embodiments of the present disclosure do not require a 3D camera, stereoscopic camera, time-of-flight camera, or other more expensive device. Accordingly, a camera suitable to perform the method may require significantly less resources (financial and/or human) to purchase, setup, and maintain.

The camera 402 may be communicatively coupled to a computer system of a service provider 406 via a network 404. A network 404 may include any suitable communication path or channel such as, for instance, a wire or cable, fiber optics, a telephone line, a cellular link, a radio frequency (RF) link, a WAN or LAN network, the Internet, or any other suitable medium. The network 404 may include any one or a combination of many different types of networks, such as cable networks, the Internet, wireless networks, cellular networks, and other private and/or public networks. In some embodiments, the camera device 402 may be coupled via hardware to the computer system as part of a single hardware unit.

Turning to the contents of the computer system 406 in more detail, the computer system 406 may comprise at least one memory 410, one or more processing units (or processor(s)) 428, a storage unit 430, a communication device 432, and an I/O device 434. The processor(s) 428 may be implemented as appropriate in hardware, computer-executable instructions, firmware or combinations thereof. Computer-executable instruction or firmware implementations of the processor(s) 428 may include computer-executable or machine executable instructions written in any suitable programming language to perform the various functions described.

The memory 410 may store program instructions that are loadable and executable on the processor(s) 428, as well as data generated during the execution of these programs. Depending on the configuration and type of service provider system 406, the memory 410 may be volatile (such as random access memory (RAM)) and/or non-volatile (such as read-only memory (ROM), flash memory, etc.). In some implementations, the memory 410 may include multiple different types of memory, such as static random access memory (SRAM), dynamic random access memory (DRAM) or ROM. The service provider system 406 may also include additional storage 430, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. The service provider system 406 may also contain communications connection(s) 432 that allow the service provider 406 to communicate with a stored database, another computing device or server, user terminals, and/or other devices on the network(s) 404. The service provider system 406 may also include input/output (I/O) device(s) and/or ports 434, such as for enabling connection with a keyboard, a mouse, a pen, a voice input device, a touch input device, a display, speakers, a printer, etc.

Turning to the contents of the memory 410 in more detail, the memory 410 may include an operating system 412 and one or more application programs or services for implementing the features disclosed herein, including a camera configuration module 414, a grid definition module 416, an object type characteristics module 418, an image reception module 420, a target (i.e., target object) recognition module 422, and a reverse projection module 424.

The operating system 412 may provide executable program instructions for the general administration and operation of that service provider computer system 406 and typically will include a computer-readable storage medium (e.g., a hard disk, random access memory, read only memory, etc.) storing instructions that, when executed by a processor of the computer system 406, allow the computer system 406 to perform its intended functions. Suitable implementations for the operating system and general functionality of the servers are known or commercially available and are readily implemented by persons having ordinary skill in the art, particularly in light of the disclosure herein.

The camera configuration module 414 (also may be called the "camera calibration module") may be responsible for determining and maintaining in memory 410 at least intrinsic parameters (describing the camera's internal characteristics), extrinsic parameters (describing the camera's position and orientation in the real world), and any distortion parameters/coefficients (which account for any lens distortions). The extrinsic parameters may allow for a real-world 3D scene to be mapped to a camera's 402 internal coordinate system, while the intrinsic parameters may allow for mapping between the camera's 402 internal coordinate system and a 2D image. Extrinsic parameters may describe, for example, a motion of an object in front of a still camera. Thus, as described above, the extrinsic parameters may translate the coordinates of a 3D point in real-world coordinate space (X, Y, Z) to a camera's coordinate system. The extrinsic parameters may be represented by a 3×3 rotational matrix (R) and a 3×1 translational vector (t). Intrinsic parameters typically do not depend on the scene viewed, and may be expressed in pixel units, including:

a focal length ($f_x$, $f_y$), and
an optical center (i.e. principal point) ($c_x$, $c_y$).

The intrinsic parameters may be represented in a 3×3 matrix (M):

$$\begin{bmatrix} f_x & 0 & c_x \\ 0 & f_y & c_y \\ 0 & 0 & 1 \end{bmatrix}$$

Additionally, the camera configuration module 414 may determine and maintain any distortion coefficients (e.g., radial distortion, tangential distortion) caused by the camera 402 lens distortions. Typically the distortion coefficients may be used when calculating the x-coordinate and y-coordinate (u, v) of a point in the pixel plane of a 2D image captured by the camera 402. These intrinsic, extrinsic, and distortion parameters may be calculated by and/or maintained by the camera configuration module 414 for use by one or more other modules of memory 410 to calculate the reverse projection of an object recognized in a 2D image into 3D coordinate space. Typically, the parameters are calculated prior to executing the reverse projection module 424 (e.g., during setup or commission of a camera being mounted for monitoring a parking lot).

The grid definition module 416 may be responsible for defining a mapping between a physical topography and a 3D coordinate space, wherein the physical topography is within a camera's 402 angle of view and is captured within a 2D image. The mapping of the 2D image to 3D coordinate space may be performed, at least in part, by a transform function that may utilize the parameters received by the camera configuration module 414. For example, as described above, the system 406 may use the extrinsic parameters to map from a point (X, Y, Z) in the real-world coordinate space (i.e. the physical topography) to a 3D point of the camera's internal coordinate system, and may use the intrinsic parameters to map from a 2D image and the camera's internal coordinate system. In this way, the system may maintain a mapping between the 2D image and 3D coordinate space. The system may further map the 3D coordinate space to a plurality of cuboids. One or more cuboids of the plurality of cuboids may be further mapped to a discrete location, wherein each discrete-location corresponds to a discrete location identifier, as discussed above. For example, and using FIG. 2 as an example reference, a system administrator may input to the grid definition module that "Parking Space F" (where the vehicle 212 is parked) may correspond to the cuboids formed by the coordinate space of 2.5 m-5.0 m along the x-axis, 0.0 m-3.0 m along the y-axis, and -2.5 m-2.5 m along the z-axis. Like the camera configuration module 414, the grid definition module 416 may determine the mapping between the physical topography and a 3D coordinate space (as well as the mapping to discrete locations corresponding to one or more cuboids of the 3D coordinate space), prior to executing the reverse projection module 424 (e.g., during setup or commission of a camera being mounted for monitoring a parking lot).

The object type characteristics module 418 may be responsible for receiving as input known physical characteristics of a physical object (i.e. a predetermined physical object), wherein the physical object is of a certain type (i.e. a predetermined physical object type). The physical object type may correspond to the target object type of the target object that the target object recognition module 422 of system 406 is configured to recognize from 2D images captured by camera 402 (discussed further below). The predetermined physical object type may be "predetermined" in the sense that the type is chosen in advance of determining which target object type the target object recognition module 422 may be configured to recognize, and before the reverse projection module 424 may be executed. The physical object type may be chosen from among other types because it includes certain known physical characteristics, each of which may help enable the reverse projection module to be successfully executed. More specifically, each of the one or more known physical characteristics of the physical object type may correspond with an aspect of a mapping a point (of two or more points corresponding to object of the physical object type) onto a 3D space (discussed further below). In some embodiments, once a suitable physical object type is chosen, then the target object recognition module 424 may be trained to recognize a target object, wherein the target object type matches the predetermined physical object type. For example, continuing with an earlier example, the object type characteristics module 418 may receive known physical characteristics of a vehicle license plate type as input (e.g., herein, the term "vehicle license plate type" (or "target object type") may correspond to any set of a plurality of vehicle license plates (or target objects) having the same known (i.e., common) physical characteristics among each other, including, for example, cars, trucks, etc.). This type of license plate, for example, has a known physical characteristic wherein any given license plate of this type has a height of 15 centimeters, and therefore, for any given upper corner and lower corner of a license plate (see example license plate shape 500, depicted in FIG. 5), the Y-coordinate of A 502 is 15 centimeters (cm) greater than the Y-coordinate of B 504 (i.e. $Y_A = Y_B + 0.15$ m). Another known physical characteristic is that corners of a same side (e.g, A 502 and B 504, C 506 and D 508) of a license plate affixed to a car are positioned, respectively, at approximately the same depth measurement along the z-axis (i.e. $A_Z \approx B_Z$, $C_Z \approx D_Z$). In some embodiments, these two known physical characteristics may be used to generate error functions, such that, when solving for a minimum (i.e. optimized) value for the error functions, a scaling factor may be determined that is used to successfully execute the reverse projection module 424 (discussed further below). In another embodiment, a vehicle license plate type may be chosen because of a known physical characteristic that the width of a license plate is substantially double the height (e.g., 30 cm:15 cm=2:1 ratio). The system may utilize this characteristic of a 2:1 ratio by converting the projected rectangular corners of a license plate in a 2D image to projected square corners, which may be used to execute the reverse projection module 424. These example embodiments have in common that they both exploit known physical characteristics of a predetermined physical object type, which enables successful execution of the reverse projection module 424.

The image reception module 420 may be responsible for receiving an image that is captured by camera 402 as input to the service provider computer system 406. The image reception module may, optionally, perform further processing on the image to prepare the image for transmission to the target object recognition module 422, discussed below. For example, image reception module 420 may compress the image, adjust the image's color level, brightness, sharpness, contrast, white balance, and/or apply filters to the image. The image reception module may also store the image to the storage unit 430, for example, to be used in future training of the target object recognition module 422. The image reception module 420 may also be configured to process a sequence of images (i.e. frames) from a video stream, and may select a sample rate at which to select images for transmission to the target object recognition module 422. For example, for a particular video content comprising frames at a rate of twenty-four frames per second, the module 420 may select one frame per second for transmission to the target object recognition module 422.

The target object recognition module 422 may be responsible for performing target object recognition on an image received from the image reception module 420. That is, the target object recognition model 422 is utilized to recognize a target object, in the example above a license plate, in an image. The target object recognition module 422 may utilize any suitable algorithm for performing the image recognition, including, but not limited to, an artificial intelligence model. As used herein, the term "artificial intelligence" refers to any suitable computer-implemented artificial intelligence technique including machine learning (supervised or unsupervised), natural language processing, machine perception, computer vision, affective computing, statistical learning and classification (including use of hidden Markov models, Bayesian network models and Kalman filters), reinforcement learning including neural networks, search algorithms and optimization algorithms (including evolutionary computing) and automated reasoning. As an example, an artificial intelligence model may be trained to recognize (i.e. "infer") a vehicle license plate affixed to a car as a target object type. The training data may include a wide variety of images, with license plates captured from various camera angles and affixed to vehicles slightly different configurations. As a result, the trained target object recognition module 422 may be able to recognize license plates in a variety of positions captured. Note that, similar to the other modules described, the target object recognition module may be embedded with the camera 402 as part of a single camera unit. In some embodiments, the target object recognition module 422 may also be trained to detect not only the position of a license plate within an image captured by the camera 402, but also detect the characters on the license plate (e.g., using optical character recognition, character segmentation, normalization, etc.).

Figure 5:
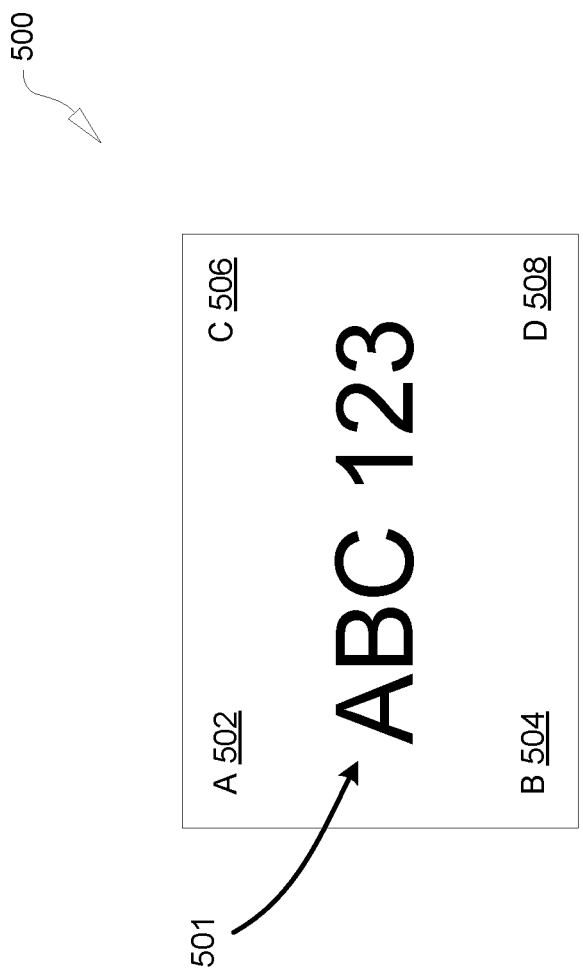
FIG. 5 illustrates attributes of an example object captured by a camera, according to an embodiment of the present disclosure.

After performing target object recognition on an image (or a frame in a video sequence of frames), in some embodiments, the target object recognition model 422 may output a target object attributes dataset. The target object attributes dataset may include a list of attributes for the particular target object that was recognized within the image, wherein the list of attributes corresponds to the particular target object type of the target object. For example, a vehicle license plate type may comprise a list of attributes describing the pixel coordinates for each of the four corners (A 502, B 504, C 506, and D 508, as shown in FIG. 5) of the license plate, as well as the alphanumeric value 501 of the license plate. Each attribute may be described by an "attribute name":"attribute value" pairing. For example:

{

"licence plate value": "ABC 123"

"topLeftX": 0,

"topLeftY": 0,

"topRightX":100,

"topRightY":0,

"bottomLeftX":0,

"bottomLeftY":100,

"bottomRightX":100,

"bottomRightY":100

}

In this example, the alphanumeric value 501 of the license plate corresponds to "ABC 123," which, as discussed above, may be inferred by optical character recognition. The other attributes may correspond to pixel coordinates for each of the four corners along an X, Y axis in a 2D coordinate plane.

The reverse projection module 424 may be responsible for receiving as input at least the following data: (i) 2D coordinates of a target object received from the target object recognition module 422, (ii) camera parameters received from the camera configuration module 414, (iii) a mapping between a physical topography within the camera 402's angle of view and a 3D coordinate space, received from the grid definition module 416 (wherein the 3D coordinate space may be further mapped to one or more discrete locations, as discussed above), and (iv) known physical characteristics of a predetermined physical object, received from the object type characteristics module 418. Using these data points as input, the reverse projection module 424 may then perform reverse projection, as described below, by outputting a mapping between 2D coordinates of the target object and a 3D coordinate space. The module 424 may further relate the 2D target object to a discrete location identifier, as discussed above.

In one embodiment, the reverse projection module 424 may proceed by first generating a set of equations and an error function. The set of equations may be generated in part based on a known algorithm, wherein the algorithm provides a way of determining, for a given point in space, P, the projection from a 3D real-world space into a 2D projection (i.e. pixelated 2D image captured by a camera 402). The algorithm may be represented algebraically as an equation:

$$s_p \begin{bmatrix} u_p \\ v_p \\ 1 \end{bmatrix} = M \left( R \begin{bmatrix} X_p \\ Y_p \\ Z_p \end{bmatrix} + t \right); \quad (1)$$

where:
- $s_p$ is a scaling factor corresponding to a particular point P.
- $u_p$ is the x-coordinate of point P
- $v_p$ is the y-coordinate of point P
- M is a 3×3 matrix of the camera's intrinsic parameters, which may correspond to the matrix (M) of intrinsic parameters maintained by the camera configuration module 414.
- R is a 3×3 matrix of the camera's extrinsic parameters, which may correspond to the matrix (R) of extrinsic parameters maintained by the camera configuration module 414.
- t is a 3×1 translational vector, which may correspond to the translational vector (t) of extrinsic parameters maintained by the camera configuration module 414.
- $X_p$, $Y_p$, and $Z_p$ are the 3D points in the real-world space for point P.

Using algebra, the equation (1) above can be rearranged such that, given a pixel coordinates (u,v), the 3D points X, Y, and Z may be determined, as shown below:

$$\begin{bmatrix} X \\ Y \\ Z \end{bmatrix} = R^{-1} \left( sM^{-1} \begin{bmatrix} u \\ v \\ 1 \end{bmatrix} - t \right); \quad (2)$$

Except for the value of the scaling factor (s), each of the values on the right side of equation (2) may be directly known, based on data points that were received as input to reverse projection module 424, as described above. The scaling factor value is not immediately known because the value has been lost by projecting from a 3D space to a 2D plane. To solve for the scaling factor value, the reverse projection module 424 may utilize the data points received as input, described above. Specifically, the module 424 may utilize known physical characteristics of a predetermined physical object, received from the object type characteristics module 418.

In one embodiment, continuing from the vehicle license plate type example described above, the module 424 may exploit the characteristic that the particular target object being analyzed is a polygon with points A, B, C, and D, at any orientation, as depicted in FIG. 5. The module 424 may also exploit the characteristic that, as discussed above, a vehicle license plate may generally have a height of 15 centimeters (cm), and therefore, for any given upper corner (A 502) and lower corner (B 504) of a license plate, the Y-coordinate of A 502 is 15 centimeters greater than the Y coordinate of B 504 (i.e. $Y_A=Y_B+0.15$ m). The module 424 may also exploit the fact that A 502 and B 504, as well as C 506 and D 508, respectively, are positioned at approximately the same depth measurement (i.e. $A_Z \approx B_Z$, $C_Z \approx D_Z$). Because A and B are geometrically similar and are positioned at approximately the same depth measurement, the system may also infer that when mapping corners A and B onto a 3D coordinate space based on a 2D image received from the camera, the scaling factor (s) may be the same for corners A and B (i.e. $s_a \approx s_b$). This inference is generally accurate within a margin of error, the margin of error being dependent at least in part on the orientation of the camera.

With this information, and utilizing equation (2), the following equations (3), (4) and error functions (5), (6), (7) may be generated:

$$\begin{bmatrix} X'_A \\ Y'_A \\ Z'_A \end{bmatrix} = R^{-1} \left( sM^{-1} \begin{bmatrix} u_A \\ v_A \\ 1 \end{bmatrix} - t \right); \quad (3)$$

$$\begin{bmatrix} X'_B \\ Y'_B \\ Z'_B \end{bmatrix} = R^{-1} \left( sM^{-1} \begin{bmatrix} u_B \\ v_B \\ 1 \end{bmatrix} - t \right); \quad (4)$$

$$e(s)_Y = Y'_A - Y'_B - 0.15; \quad (5)$$

$$e(s)_Z = Z'_A - Z'_B; \quad (6)$$

$$e(s) = e(s)_Y^2 + e(s)_Z^2; \quad (7)$$

Note that the error function (7) with respect to a particular scale factor (s) is quadratic in nature, allowing the equation to be solved as a traditional optimization problem (equation (8), below). (The error function (7) can be assumed to be concave upward because the coefficients of the polynomial affect are positive.)

$$e(s)=0; \quad (8)$$

Solving equation (8) will yield the scaling factor (s) that will result in the minimum error value for s, given the particular constraints. Once s is determined, then the values of X, Y, and Z coordinates for a given point (e.g., A 502 or B 504) may be determined by substituting s into equations (3) and (4). This approach thereby allows a point (u,v) in the 2D pane to be reverse projected to a 3D point (with coordinates X, Y, and Z). With the 3D coordinates for a given point, the reverse projection module 424 can then map the point to one or more cuboids that comprise the 3D space, and then further to a discrete location identifier, via the information provided by the grid definition module 416.

In another embodiment, and continuing from the vehicle license plate type example described above, the system may use an alternative approach for performing reverse projection. In this embodiment, and as depicted in the diagram 600 of FIG. 6, the reverse projection module 424 may exploit the characteristic that the particular target object (i.e. vehicle license plate) being analyzed is a rectangular-shaped polygon, wherein the width 604 (*m*) of a license plate is approximately double the height 602 (*n*) (e.g., m:n ratio=30 cm:15 cm=2:1). With this information and the other data points received as input by the reverse projection module 424, described further below, the module 424 may first modify at least some of the data points so that they are in a suitable format to be input as parameters to a function (cv:aruco::estimatePoseSingleMarkers( )) of the Open Source Computer Vision Module (OSCVM). This OSCVM function may, in turn, perform the process of reverse projection.

Figure 6:
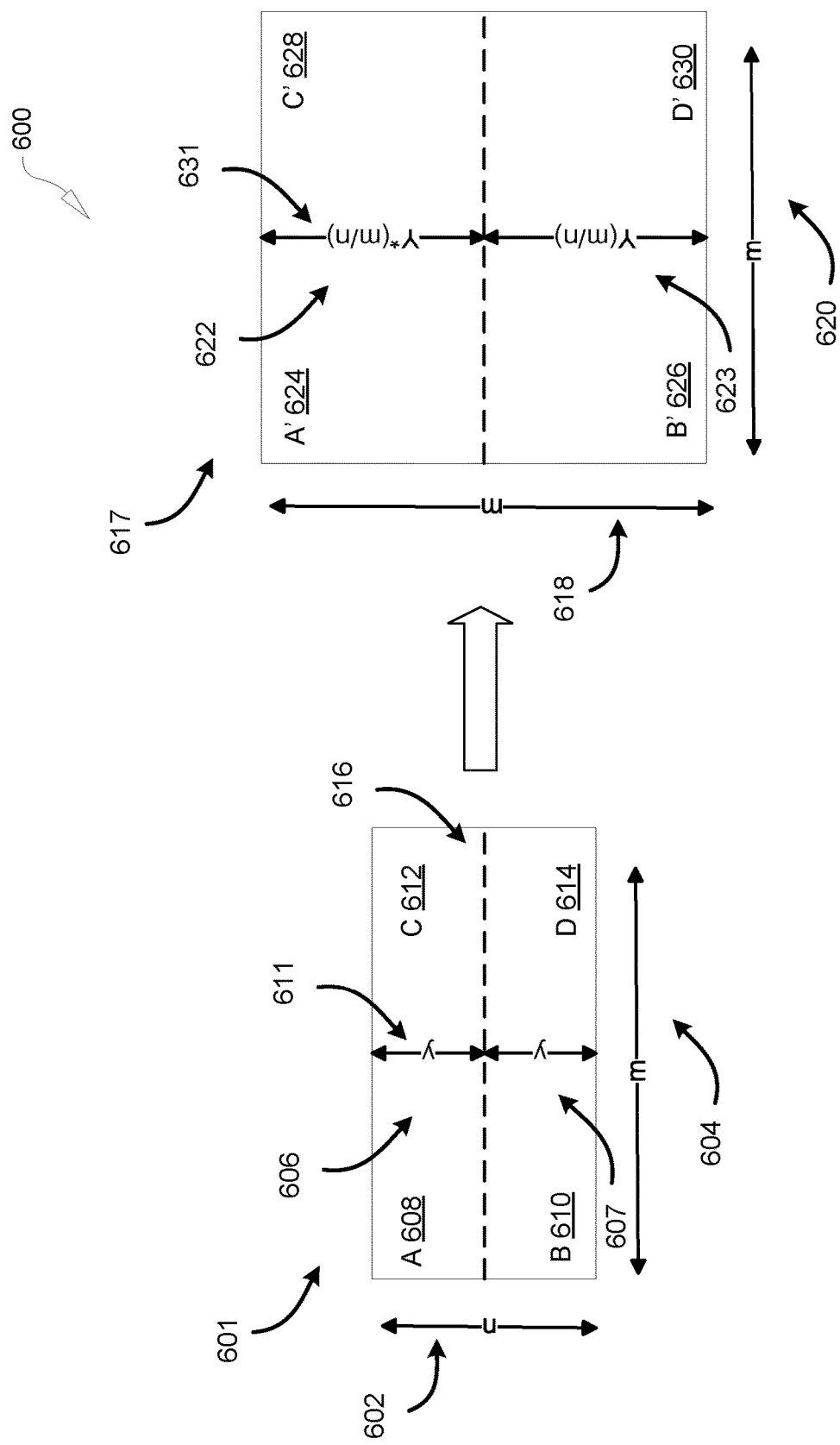
FIG. 6 illustrates an example technique for performing a function of the system illustrated in FIG. 4, according to an embodiment of the present disclosure.

The modification of the data points to be in a suitable format may involve, for example, converting the shape of the license plate target object within the 2D image from a rectangular shape to a square shape, as depicted in FIG. 6 and described below. In FIG. 6, target object 601 may correspond to a target object (i.e. vehicle license plate of rectangular shape) that was recognized by the target object recognition module 422 of FIG. 4. As described above, the license plate may have a width m 604 (e.g., 30 cm), and a height n 602 (e.g., 15 cm), wherein m is twice the value of n. To perform the conversion to a square shape, the rectangle may be divided into an upper half 606 and a lower half 607 (with the central axis 616 as a demarcation) of equal heights y 611 (i.e. where y=n/2). The rectangular shape 601 may have four corners, A 608, B 610, C 612, and D 614. The module 424 may convert the rectangular shape 601 into a square shape 617, for example, by extending the sides of the 2D projection of the rectangular shape 601 so that the height n may be doubled to become m. It may do this by extending the height of the upper half 606 the rectangular target object 601 above the central axis 616 by a factor of y*m/n 631 (i.e. m/2), so that the upper half 606 is extended to become a new upper half 622. It may do the same for the lower half 607 of the rectangular target object 601, extending it to become a new lower half 623 (i.e. effectively extending both halves by the same length m/2). Thus, the new square shape 617 has a height m 618 and a width m 620. Furthermore, the rectangle corners A 608, B 610, C 612, and D 614, may now correspond, respectively, to square corners A' 624, B' 626, C' 628, and D' 620.

Once the conversion is performed, the reverse projection module 424 may utilize an Open Source Computer Vision Module and call the cv:aruco::estimatePoseSingleMarkers( ) function. In calling the function, the module 424 may pass as input a 3×3 camera matrix of the camera's 402 intrinsic parameters (which may be received from the camera configuration module 414), pixel coordinates for each of the four corners of the square (which may be received from the target object recognition module 422), distortion coefficients (which may be received from the camera configuration module 414), and a length value (e.g., in meters) which corresponds to a length 618, 620 of the square's side (which may be previously determined in module 424, as described above). The cv:aruco::estimatePoseSingleMarkers( ) function may return one or more data structures corresponding to the X, Y, Z coordinates of each of the four corners of the square. With the 3D coordinates for the given corners of the license plate in the 2D image, the reverse projection module 424 can then map the point(s) to one or more cuboids that comprise the 3D space, and then further to a discrete location identifier, via the information provided by the grid definition module 416.

It should be understood that while the embodiments described above pertain to performing reverse projection on a vehicle license plate, the present disclosure is not so limited. For example, the method may be performed on another physical object captured by a photographic image, wherein known physical characteristics about the object allow a calculation to be performed which produces the scaling factor needed to convert from a point in a 2D plane to 3D coordinates.

Figure 7:
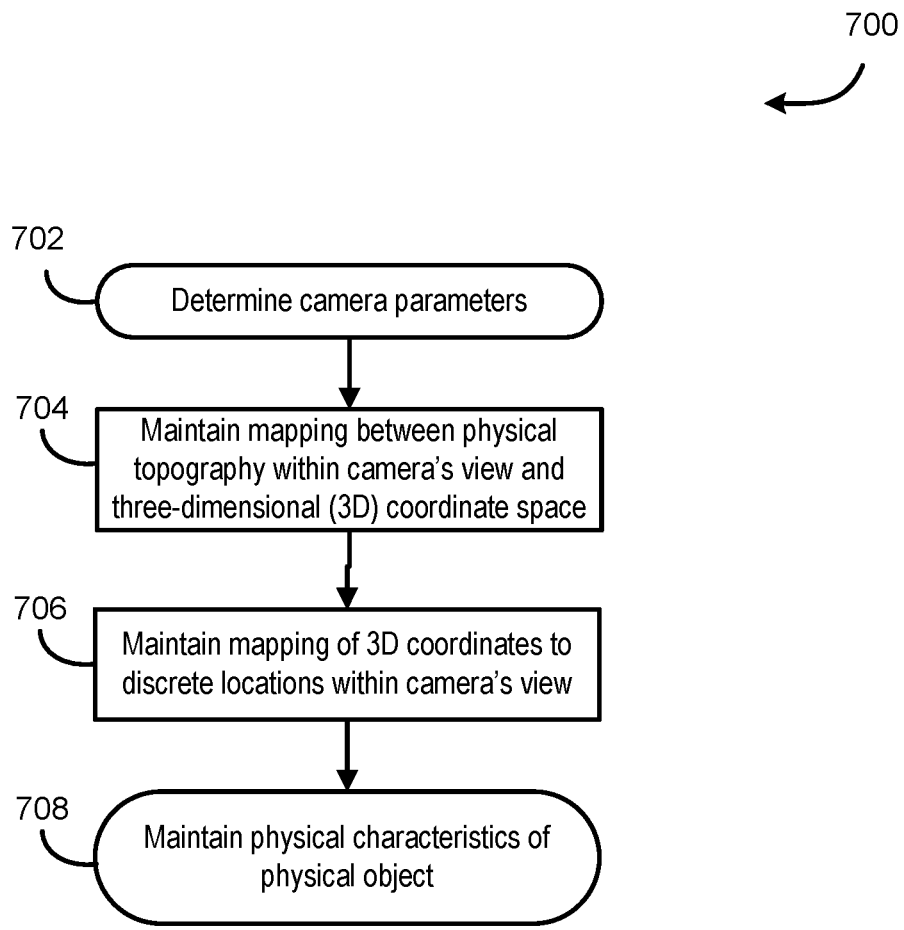
FIG. 7 illustrates an example flow for configuring the system of FIG. 4, according to an embodiment of the present disclosure.

FIG. 7 illustrates an example flow for configuring a computer system (which may correspond to the service provider computer system 406 of FIG. 4), according to an embodiment of the present disclosure. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The example flow may start at operation 702, where camera configuration module 414 may determine the parameters of camera 402, wherein the parameters may include at least intrinsic parameters, extrinsic parameters, and distortion parameters (i.e. coefficients), as described above. The system may maintain the camera parameters in some type of memory (e.g., volatile memory) or storage unit, for later use within another operation of process 700, or during execution of a reverse projection by the computer system (e.g., within one of the operations of process 800). The maintenance of data (e.g., camera parameters) in memory or storage for later use may also apply to each of the operations of process 700, discussed below.

At operation 704, a module of the computer system (which may correspond to grid definition module 416) may determine a mapping between a physical topography within the camera's angle of view and a 3D coordinate space. The mapping may be performed at least in part by utilizing the camera parameters maintained by the computer system at operation 702. The 3D coordinate space may form a plurality of cuboids, as described above.

At operation 706, a module of the computer system (which may also correspond to grid definition module 416) may determine a mapping between one or more cuboids of the three-dimensional coordinate space (formed at operation 704) and one or more discrete location identifiers, wherein the physical topography of operation 704 comprises one or more discrete locations, and wherein each of the one or more discrete locations respectively corresponds to the one or more discrete location identifiers.

At operation 708, the system may determine one or more known physical characteristics of a physical object type. An object of the physical object type may correspond to at least two points, wherein each of the points is mappable onto a 3D coordinate space. The one or more known physical characteristics each corresponds to an aspect of a mapping of a point onto the three-dimensional coordinate space (e.g., the relative position of one point to another point along one or more axes). The physical characteristics are determined such that they may be used by the system to enable the mapping of the two or more points corresponding to the object, represented in a two-dimensional plane (i.e. image), to the three-dimensional coordinate space, and thereby, to a discrete location identifier.

Figure 8:
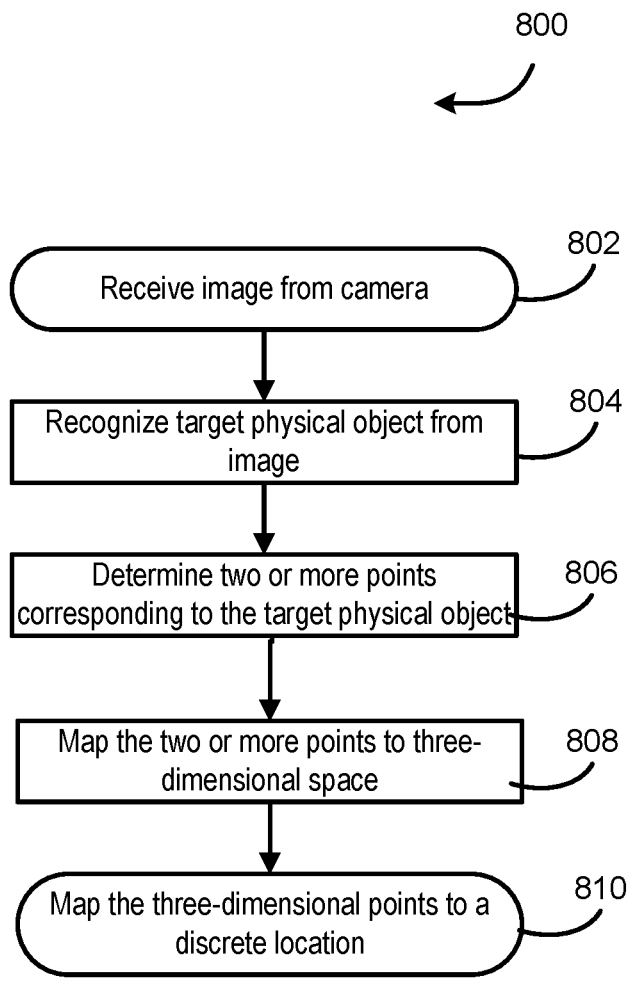
FIG. 8 illustrates an example flow for executing the system of FIG. 4, according to an embodiment of the present disclosure.

FIG. 8 illustrates an example flow for executing reverse projection on a computer system (which may correspond to the service provider computer system 406 of FIG. 4), according to an embodiment of the present disclosure. In some embodiments, the operations of FIG. 8 may be executed after the computer system has been configured according to the operations of FIG. 7.

At operation 802, the system may receive an image (e.g., 2D image) from a camera. The camera may correspond to the camera 402 of FIG. 4, and the image may capture the physical topography within the camera's angle of view, as described in operation 704. As described above, the system may be embedded with the camera (e.g., the image may be processed on-site), or the image may be sent over a network (e.g., network 404 of FIG. 4) to the system for further processing (e.g., received by the image reception module 420 of FIG. 4).

At operation 804, having received the image, the system may recognize a target object from the image, wherein the target object type of the target object corresponds to a predetermined physical object type (i.e. the object type whose physical characteristics were determined and maintained previously in process 700 at operation 708). The system may utilize a target object recognition model to recognize the target object, wherein the target object recognition model may be a trained reinforcement learning model (e.g., a neural network utilized by the target object recognition module 422 of FIG. 4).

At operation 806, the system may determine at least two points (i.e. a plurality of points) corresponding to the target object recognized at operation 804. These two or more points may, respectively, correspond to the two or more points of the predetermined physical object type, determined at operation 708. The two or more points may be output to some form of target object attributes dataset. In some embodiments, the target object attributes dataset may describe attributes of the target object (e.g. 2D (X,Y) coordinates for each of the four corners of a license plate, alphanumeric values indicating the identity of the license plate, etc.), which may be some form of "attribute name": "attribute value" pairing.

At operation 808, the system may reverse project the two or more 2D points of the target object determined at operation 806 to points in 3D coordinate space, utilizing, for example, one of the embodiments employed by the reverse projection module 424 of FIG. 4, described above. It should be understood that in either of the embodiments for performing reverse projection, the system may use known physical characteristics of the target object type (i.e. corresponding to the predetermined physical object type) to perform the mapping, as described above. Additionally, while the system reverse projects each point of the two or more 2D points to a point in 3D coordinate space, the system performs the reverse projection of the two or more 2D points together as a group, as described in the embodiments above.

At operation 810, the system may map the two or more 3D points, each determined by the results of the reverse projection at operation 808, to a single discrete location identifier. This mapping may be achieved by utilizing the mappings previously determined and maintained at operation 704 and 706 of FIG. 7. For example, once two or more corners of a target object (e.g., license plate corners) have been mapped to 3D space, then it can be determined which cuboid(s), formed by the three-dimensional space, includes two or more corners. Finally, it can be determined which parking space in a parking lot includes the cuboid(s). The system may be configured in any suitable way to deal with scenarios wherein points from a target object may be mapped to cuboids corresponding to different parking spaces. For example, the system may prompt a distribution staff member to visually inspect the 2D image and determine which parking space the vehicle is parked in.

Figure 9:
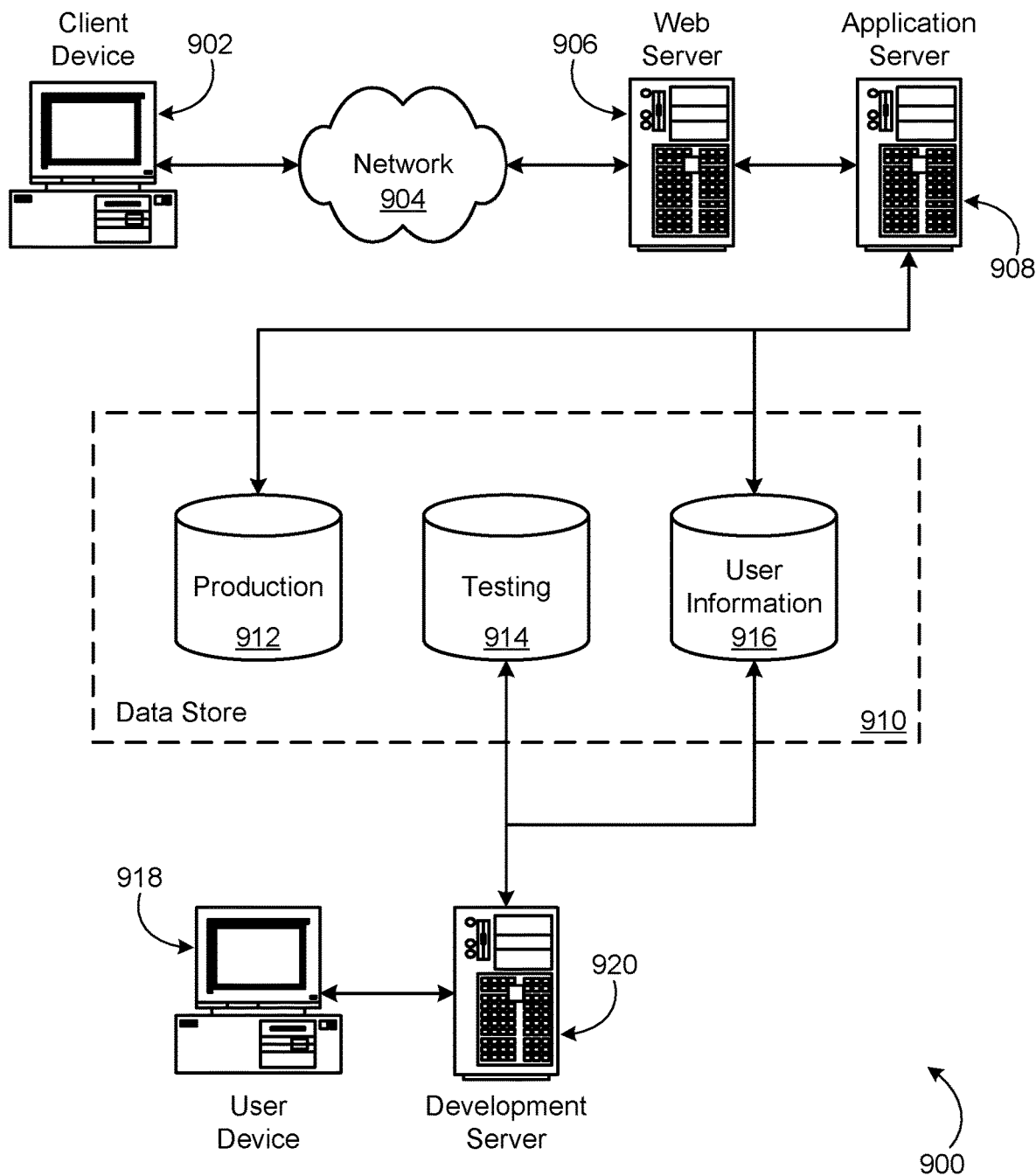
FIG. 9 is a schematic diagram illustrating an example environment for implementing aspects in accordance with at least one embodiment.

Various approaches to the method and system described above may be implemented in various environments for various applications. For example, FIG. 9 illustrates aspects of an example environment 900 for implementing aspects in accordance with various embodiments. As will be appreciated, although a Web-based environment may be utilized for purposes of explanation, different environments may be utilized, as appropriate, to implement various embodiments. The environment 900 shown includes both a testing or a development portion (or side) and a production portion. The production portion includes an electronic client device 902, which may include any appropriate device operable to send and receive requests, messages, or information over an appropriate network 904 and convey information back to a user of the device 902. Examples of such client devices include personal computers, cell phones, handheld messaging devices, laptop computers, tablet computers, set-top boxes, personal data assistants, electronic book readers, and the like.

The network 904 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 904 includes the Internet, as the environment includes a Web server 906 for receiving requests and serving content in response thereto, although for other networks an alternative device serving a similar purpose could be utilized as would be apparent to one of ordinary skill in the art.

The illustrative environment 900 includes at least one application server 908 and a data store 910. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 908 may include any appropriate hardware and software for integrating with the data store as needed to execute aspects of one or more applications for the client device 902, and may even handle a majority of the data access and business logic for an application. The application server 908 provides access control services in cooperation with the data store 910, and is able to generate content such as text, graphics, audio, and/or video to be transferred to the user, which may be served to the user by the Web server 906 in the form of HTML, XML, or another appropriate structured language in this example.

The handling of requests and responses, as well as the delivery of content between the client device 902 and the application server 908, may be handled by the Web server 906. It should be understood that the Web and application servers 906, 908 are not required and are merely example components, as structured code discussed herein may be executed on any appropriate device or host machine as discussed elsewhere herein. Further, the environment 900 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 900 may also include a development and/or testing side, which includes a user device 918 allowing a user such as a developer, data administrator, or tester to access the system. The user device 918 may be any appropriate device or machine, such as is described above with respect to the client device 902. The environment 900 may also include a development server 920, which functions similar to the application server 908 but typically runs code during development and testing before the code is deployed and executed on the production side and becomes accessible to outside users, for example. In some embodiments, an application server may function as a development server, and separate production and testing storage may not be utilized.

The data store 910 may include several separate data tables, databases, or other data storage mechanisms and media for storing data relating to a particular aspect. For example, the data store 910 illustrated includes mechanisms for storing production data 912 and user information 916, which may be utilized to serve content for the production side. The data store 910 also is shown to include a mechanism for storing testing data 914, which may be utilized with the user information for the testing side. It should be understood that there may be many other aspects that are stored in the data store 910, such as for page image information and access right information, which may be stored in any of the above listed mechanisms as appropriate or in additional mechanisms in the data store 910.

The data store 910 is operable, through logic associated therewith, to receive instructions from the application server 908 or development server 920, and obtain, update, or otherwise process data in response thereto. In one example, a user might submit a search request for a certain type of item. In this case, the data store 910 might access the user information 916 to verify the identity of the user, and may access the catalog detail information to obtain information about items of that type. The information then may be returned to the user, such as in a results listing on a Web page that the user is able to view via a browser on the user device 902. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 900 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a two-dimensional image from a two-dimensional camera, the two-dimensional image including a representation of a physical topography and a target object of a plurality of target objects, the plurality of target objects being associated with a common physical characteristic, the common physical characteristic of the target object being detectable within the two-dimensional image; and
    determining, utilizing reverse projection, a three-dimensional position relative to the physical topography of the target object based upon a two-dimensional position of the target object in the image and the common physical characteristic of the target object, the common physical characteristic used to determine at least a dimension of the three-dimensional position, the physical topography represented in a three-dimensional space, the three-dimensional position determined relative to the three-dimensional coordinate space, wherein the three-dimensional coordinate space forms a plurality of cuboids, and wherein determining the three-dimensional position in the three-dimensional coordinate space comprises mapping the target object to one or more cuboids of the plurality of cuboids.

2. A computer-implemented system, comprising:
    one or more processors; and
    one or more computer-readable storage media storing instructions that, upon execution with the one or more processors, cause the computer-implemented system to, at least:
        receive an image from a camera, the image corresponding to a representation of a physical topography, the physical topography being mapped to a three-dimensional coordinate space;
        determine, based at least in part on a target object recognition model, that a target object is present in the image, a target object type of the target object being a predetermined physical object type, wherein each object of the predetermined physical object type corresponds to at least two points, the at least two points each being detectable within the image and being mappable onto the three-dimensional coordinate space, and wherein each object of the predetermined physical object type has one or more physical characteristics, each physical characteristic corresponding to an aspect of mapping a point of the at least two points onto the three-dimensional coordinate space;
        determine a position of the target object in the three-dimensional coordinate space based at least in part on the determination that the target object type of the target object matches the predetermined physical object type and the one or more physical characteristics of the predetermined physical object type; and output a position of the target object relative to the physical topography, based at least in part on the position of the target object in the three-dimensional coordinate space.

3. The computer-implemented method of claim 1, wherein determining the three-dimensional position further comprises:

based upon the one or more cuboids of the plurality of cuboids and one or more discrete location identifiers, associating the target object position with a discrete location of a plurality of discrete locations, wherein each of the plurality of discrete locations respectively corresponds to the one or more discrete location identifiers.

4. The computer-implemented method of claim 3 wherein the plurality of discrete locations are vehicle parking spaces of a vehicle parking lot.

5. The computer-implemented method of claim 1 wherein the common physical characteristic comprises two points of the plurality of target objects being spaced substantially the same.

6. The computer-implemented method of claim 5 wherein determining the three-dimensional position comprises setting a scaling factor corresponding to a first point of the two points of the plurality of target objects to be substantially the same as a scaling factor corresponding to a second point of the two points of the plurality of target objects.

7. The computer-implemented method of claim 6 wherein the target object is a vehicle license plate, and the first and second points are corners of the vehicle license plate.

8. The computer-implemented method of claim 1,
wherein determining a three-dimensional position in three-dimensional space of the target object comprises determining the three-dimensional position based at least in part on parameters of the camera, the parameters of the camera comprising at least one or more intrinsic parameters, one or more extrinsic parameters, and one or more distortion coefficients.

9. A computer-implemented system, comprising:
one or more processors; and
one or more computer-readable storage media storing instructions that, upon execution with the one or more processors, cause the computer-implemented system to, at least:

receive an image from a camera, the image corresponding to a representation of a physical topography, the physical topography being mapped to a three-dimensional coordinate space;

determine, based at least in part on a target object recognition model, that a target object is present in the image, a target object type of the target object being a predetermined physical object type, wherein each object of the predetermined physical object type corresponds to at least two points, the at least two points each being detectable within the image and being mappable onto the three-dimensional coordinate space, and wherein each object of the predetermined physical object type has one or more physical characteristics, each physical characteristic corresponding to an aspect of mapping a point of the at least two points onto the three-dimensional coordinate space;

determine a position of the target object in the three-dimensional coordinate space based at least in part on the determination that the target object type of the at least one target object matches the predetermined physical object type and the one or more physical characteristics of the predetermined physical object type; and output a position of the target object relative to the physical topography, based at least in part on the position of the target object in the three-dimensional coordinate space.

10. The computer-implemented system of claim 9 wherein the predetermined physical object type is a vehicle license plate type.

11. The computer-implemented system of claim 10 wherein the one or more physical characteristics of the object of the vehicle license plate type comprises the object being a rectangular shape, wherein a length of the object is substantially double a width of the object.

12. The computer-implemented system of claim 11 wherein outputting information comprises converting the rectangular shape to a square shape, based in part on the determination that the target object type is the vehicle license plate type.

* * * * *

UNITED STATES PATENT AND TRADEMARK OFFICE
CERTIFICATE OF CORRECTION

PATENT NO. : 10,755,571 B1
APPLICATION NO. : 16/290569
DATED : August 25, 2020
INVENTOR(S) : James Lance Eather et al.

Page 1 of 1

It is certified that error appears in the above-identified patent and that said Letters Patent is hereby corrected as shown below:

In the Claims

Column 26, Line 27, Claim 9:
Delete: "at least one"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*